United States Patent [19]

Hamaue

[11] Patent Number: 5,055,824
[45] Date of Patent: Oct. 8, 1991

[54] SYSTEM FOR WARNING AN EFFECTIVE RESTRAINT LIMIT OF A SEAT BELT

[75] Inventor: Tetsuya Hamaue, Shiga, Japan

[73] Assignee: Takata Corporation, Tokyo, Japan

[21] Appl. No.: 593,735

[22] Filed: Oct. 5, 1990

[30] Foreign Application Priority Data

Oct. 20, 1989 [JP] Japan ................... 1-273233

[51] Int. Cl.$^5$ ............................................. B60Q 1/00
[52] U.S. Cl. .................................. 340/438; 340/457; 340/457.1; 297/468
[58] Field of Search ................. 297/468; 200/61.58 B, 200/61.58 R; 307/10.1; 340/438, 439, 457, 457.1, 425.5, 686; 280/801, 808; 180/268

[56] References Cited

U.S. PATENT DOCUMENTS

| | | | |
|---|---|---|---|
| 3,840,849 | 10/1974 | Lohr | 200/61.58 B |
| 3,906,410 | 9/1975 | Andersen et al. | 340/457.1 |
| 3,980,988 | 9/1976 | Spizzo | 200/61.58 S |
| 4,659,108 | 4/1987 | Sack et al. | 180/268 |
| 4,852,934 | 9/1989 | Yasuda et al. | 340/425.5 |
| 4,888,535 | 12/1989 | Brusasco | 307/10.1 |
| 4,920,620 | 5/1990 | Yamamo et al. | 200/61.58 B |
| 4,943,087 | 7/1990 | Sasaki | 297/468 |
| 4,967,178 | 10/1990 | Saito et al. | 340/425.5 |

FOREIGN PATENT DOCUMENTS 2110921 6/1983 United Kingdom .

Primary Examiner—Peter R. Brown
Assistant Examiner—Cassandra L. Hope
Attorney, Agent, or Firm—Kanesaka and Takeuchi

[57] ABSTRACT

A system for warning an effective restraint limit of a seat belt, comprising a seat slidably adjustable in a to-and-fro direction and tiltably adjustable, a seat belt for restraining an occupant seated on the seat, a sensor device for detecting an effective restraint limit of the seat belt, a notice device for notifying the occupant of the result as detected by the sensor device, characterized in that the effective restraint limit of the seat belt as detected by the sensor device is a reclining angle corresponding to a position of the seat as slidably adjusted.

4 Claims, 7 Drawing Sheets

SYSTEM FOR WARNING AN EFFECTIVE RESTRAINT LIMIT OF A SEAT BELT

FIELD OF THE INVENTION AND RELATED ART STATEMENT

The present invention relates to a seat belt system for an automotive vehicle and more particularly, to a system for warning an effective restraint limit of a seat belt, which is operable to sense an effective restraint limit of the seat belt and to give a warning to a n occupant when the seat belt is moved beyond its effective restraint limit.

An automotive vehicle generally includes a seat belt system intended to protect an occupant during collision or other emergent occasion by restraining him within the vehicle so as not to suffer from secondary collision impact.

FIGS. 5A to 5C are views showing the manner in which a seat 16 is adjusted, and in which a seat belt 15 is fastened to restrain an occupant seated thereon.

A portion of the seat belt 15 that restrains the occupant must have a high strength in order to withstand impulsive loading, several ten times greater than the weight of the occupant, applied instantaneously at the time of collision. To this end, it is preferred that normally, a lap belt 15b positively engages hipbone, and a shoulder belt 15a is held in contact with a portion (hereinafter referred to as a shoulder portion) located between a shoulder joint and a neck as shown in FIG. 5A.

A seat 16 for such a vehicle and the like is slidably adjustable in a to-and-fro direction to correspond with the size of components, Also, a backrest 16b is tiltably adjustable to any angular position.

However, when the seat 16 is slidably moved to a position (as at 16') beyond a certain range as shown in FIG. 5B, the shoulder belt 15a will be separated from the shoulder portion of the occupant.

Also, when the backrest 16b is tilted at an angle substantially greater than a predetermined angle θ (not shown) as shown in FIG. 5C, the shoulder belt 15a will be separated from the shoulder portion of the occupant. Consequently, the optimum restraint condition can not be obtained, and the seat belt is eventually unable to restrain the occupant.

It will be noted that the angle θ is not always constant, and it varies with the position of the seat 16.

Specifically, when the seat 16 is placed in its forward position, the seat belt will not be positioned beyond its effective restraint limit if the backrest 16b is substantially tilted. On the other hand, when the seat 16 is placed in its rearward position, the seat belt will be positioned beyond its effective restraint position of the seat 16 even if the backrest 16b is slightly tilted.

This is due to the fact that an upper fixed position 15c of the shoulder belt 15a remains substantially unchanged (generally, center pillar of the vehicle) during sliding movement of the seat 16.

As such, the seat belt 15 can not effective restrain and fully protect the occupant during collision or other emergent occasion when the occupant is placed in its unrestrained position as shown in FIGS. 5B and 5C, without knowing such a condition.

OBJECT AND SUMMARY OF THE INVENTION

Accordingly, it is an object of the present invention to provide a system for warning an effective restraint limit of a seat belt which enables an occupant to know an effective restraint limit of the seat belt during adjustment of the seat and improves the safety.

In order to achieve the foregoing object, according to the present invention, there is provided a system for warning an effective restraint limit of a seat belt, which comprises a seat slidably adjustable in a to-and-fro direction and tiltably adjustable, a seat belt for restraining an occupant seated on the seat, a sensor device for detecting an effective restraint limit of the seat belt, and a notice device for notifying the occupant of a result as detected by the sensor device, wherein in that the effective restraint limit of the seat belt as detected by the sensor device is a reclining angle corresponding to a position of the seat as slidably adjusted.

The sensor device of the present invention is operable to sense an effective restraint limit, which is reclining angle corresponding to the position of the seat as slidably adjusted. The notice device is then activated to notify the occupant that the seat is adjusted to the extent beyond the effective restraint limit of the seat belt and give to the occupant a warning to this effect.

DESCRIPTION OF THE PREFERRED EMBODIMENTS

The present invention will now be described in detail by way of example.

Figure 1A:
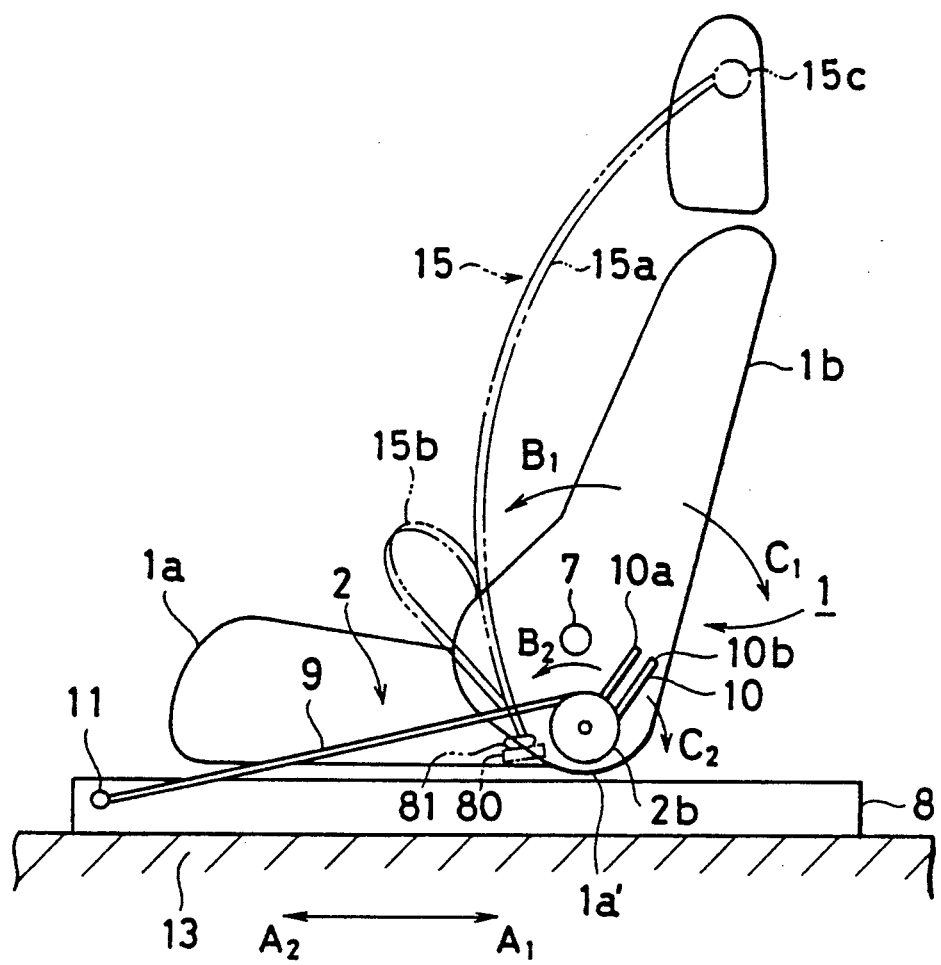
FIG. 1A is a side view showing the manner in which a system according to one embodiment of the present invention is mounted to a seat.
Figure 1B:
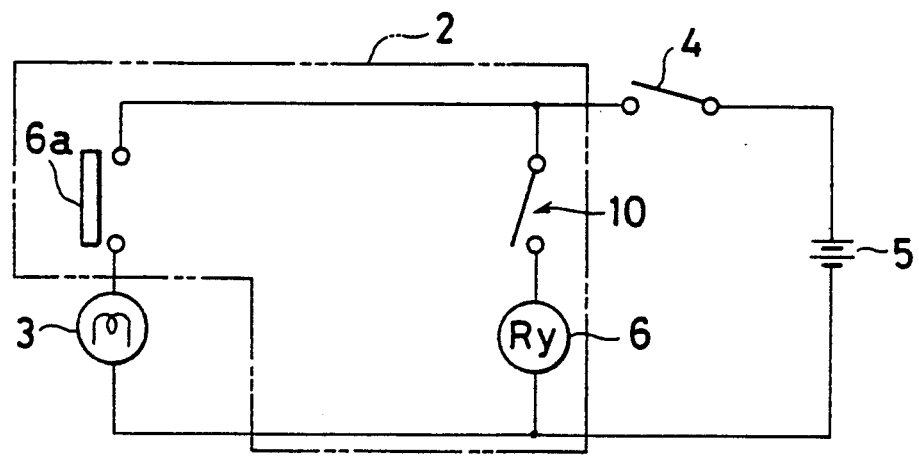
FIG. 1B is a block diagram showing a circuit of sensor means and notice means of the system according to one embodiment of the present invention.

FIGS. 1A and 1B show a system for warning an effective restraint limit of a seat belt, which includes a seat 1 disposed within a vehicle body and slidably adjustable in a a to-and-fro direction and tiltably adjustable. Disposed at one side of the seat 1 are a sensor device 2 for detecting the condition in which the seat 1 is moved to the extent beyond an effective restraint limit of a seat belt 15 as a restraint means, and a notice device 3 for giving to an occupant a warning of this effect.

As shown in FIG. 1B, a circuit includes a switch 10 which constitutes the sensor device 2 as will be described in detail hereinafter, a relay 6 for actuating a contact 6a when the switch 10 is energized, a lamp 3 serving as the notice device and turned on when the relay 6 is operated, a switch 4 energized when a seat buckle 80 of the seat 1 receives a tongue 81 loosely fit around intermediate portion of the seat belt 15, and a power source 5 such as a battery mounted in the vehicle.

The notice device 3 is not limited to the lamp 3 and may, for example, be a combination of a buzzer, a synthetic voice IC and a speaker as far as it functions to warn when the seat is moved to the extent beyond the effective restraint limit of the seat belt 15.

The seat 1 include a seat cushion 1a on which the occupant is seated, and a reclining backrest 1b tiltable about one end 1a' of the seat cushion 1a in the directions of the arrows $B_1$ and $C_1$. Also, the seat 1 is slidably adjustable on rails 8 placed on a floor 13 of the vehicle in the directions of the arrows $A_1$ and $A_2$.

The sensor device 2 includes a rotary member 2b rotatable separately about the common axis as the backrest 1b of the seat 1 in the directions of the arrows $B_2$ and $C_2$, a switch 10 composed of two resilient members 10a and 10b made of an electrically conductive material and extending in parallel from the rotary member 2b, a fixed point 11 provided at one end of the rail 8, a wire 9 having one end wound around the outer periphery of the rotary member 2b and the other end fixed to the fixed point 11, whereby the rotary member 2b can be rotated at a predetermined angle in the directions of the arrows $B_2$ or $C_2$ in proportion to the distance by which the seat 1 is moved and the direction $A_1$ or $A_2$ of movement of the seat 1, and a bias member 12 (see FIG. 1C) for biasing the rotary member 2b in the direction ($C_2$) in which the wire 9 is constantly pulled, and a projecting pin 7 extending from one side of the backrest 1b adjacent the resilient members 10a and 10b mounted to the rotary member 2b.

Figure 1C:
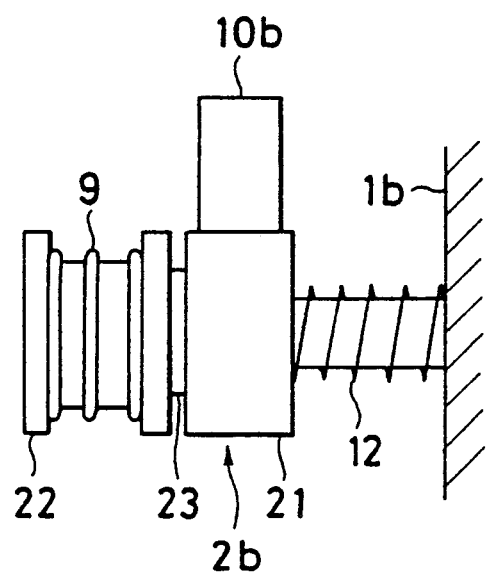
FIG. 1C is a schematic view of a rotary member.

As shown in FIG. 1C, the rotary member 2b includes a body portion 21 to which the switch, composed of the two resilient members 10a and 10b, is mounted, and a reel portion 22 around which the wire 9 is wound. The body portion 21 and the reel portion 22 are connected together through a known reduction mechanism 23 having a predetermined reduction ratio 1/n (n is greater than 1). Accordingly, if the reel portion 22 turns once, then the body portion 21 turns 1/n time.

In connection with the effective restraint limit of the seat belt, the length of the wire and the reduction ratio 1/n of the rotary member 2b should previously be determined in consideration of allowable sliding distance of the seat 1 relative to the upper fixed position of the shoulder belt 15a and allowable reclining angle of the backrest 1b.

Operation of the system for warning an effective restraint limit of the seat belt thus constructed will be described with reference to FIGS. 2A to 4B.

Figure 2A:
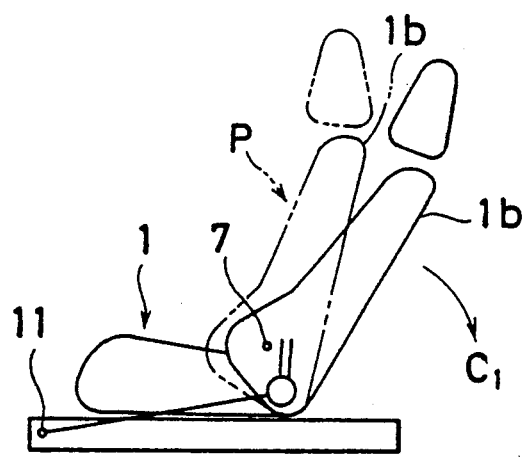
FIG. 2A is a schematic side view showing the manner in which a backrest is tilted.
Figure 2B:
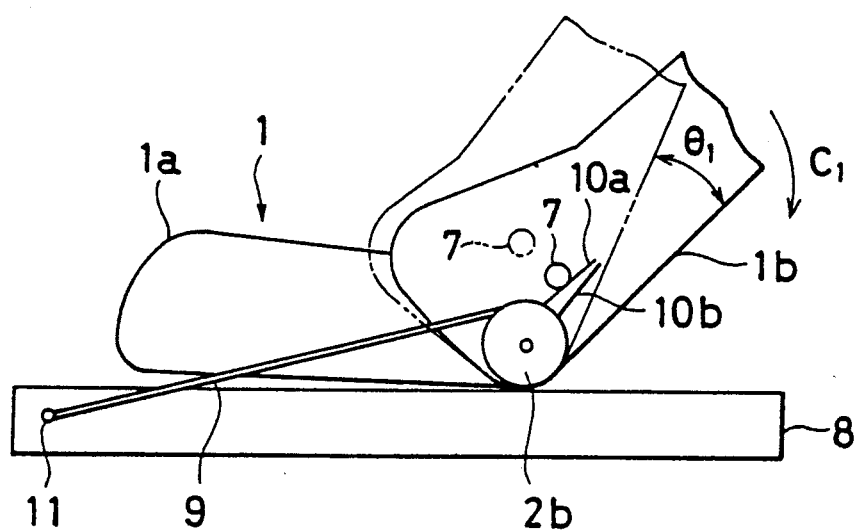
FIG. 2B is a fragmentary view, on an enlarged scale, of the backrest shown in FIG. 2A.

FIGS. 2A and 2B show the manner in which the backrest 1b is tilted in the direction of the arrow $C_1$. FIG. 2B is an enlarged detailed view thereof.

First, when the passenger inserts the tongue 81 into the buckle 80 as shown in FIG. 1B, the switch 4 as shown in FIG. 1B is energized.

The backrest 1b is then tilted in the direction of the arrow $C_1$ from an initial position P (the backrest is raised to the maximum possible extent). When the backrest 1b is tilted at an angle greater than a predetermined angle $\theta_1$, the projecting pin 7 extending from one side of the backrest 1b is brought into contact with the resilient member 10a extending from the rotary member 2b.

It is the effective restraint limit of the seat belt 15 when the backrest 1b is tilted at the angle $\theta_1$. If tilted at an angle greater than the angle $\theta_1$, both resilient members 10a and 10b continue contact and to be in contact with one another, and the switch 10 is kept "on". As a result, the relay 6 is energized to close the contact 6a. The lamp 3 is then turned on. This will let the occupant known that the backrest 1b is tilted at such an angle that the seat belt 15 is positioned beyond its effective restraint limit. The backrest 1b is then tilted back until the angle becomes less than the angle $\theta_1$ so as to place the seat belt 15 within its effective restraint limit.

Then, the backrest 1b is returned to its raised position so that its reclining angle is smaller than the angle $\theta_1$. This causes the resilient members 10a and 10b to separate from one another. As a result, the switch 10 becomes off, and the lamp 3 is turned off.

Next, reference will be made to the manner in which the seat 1 is slidably adjusted.

Figure 3:
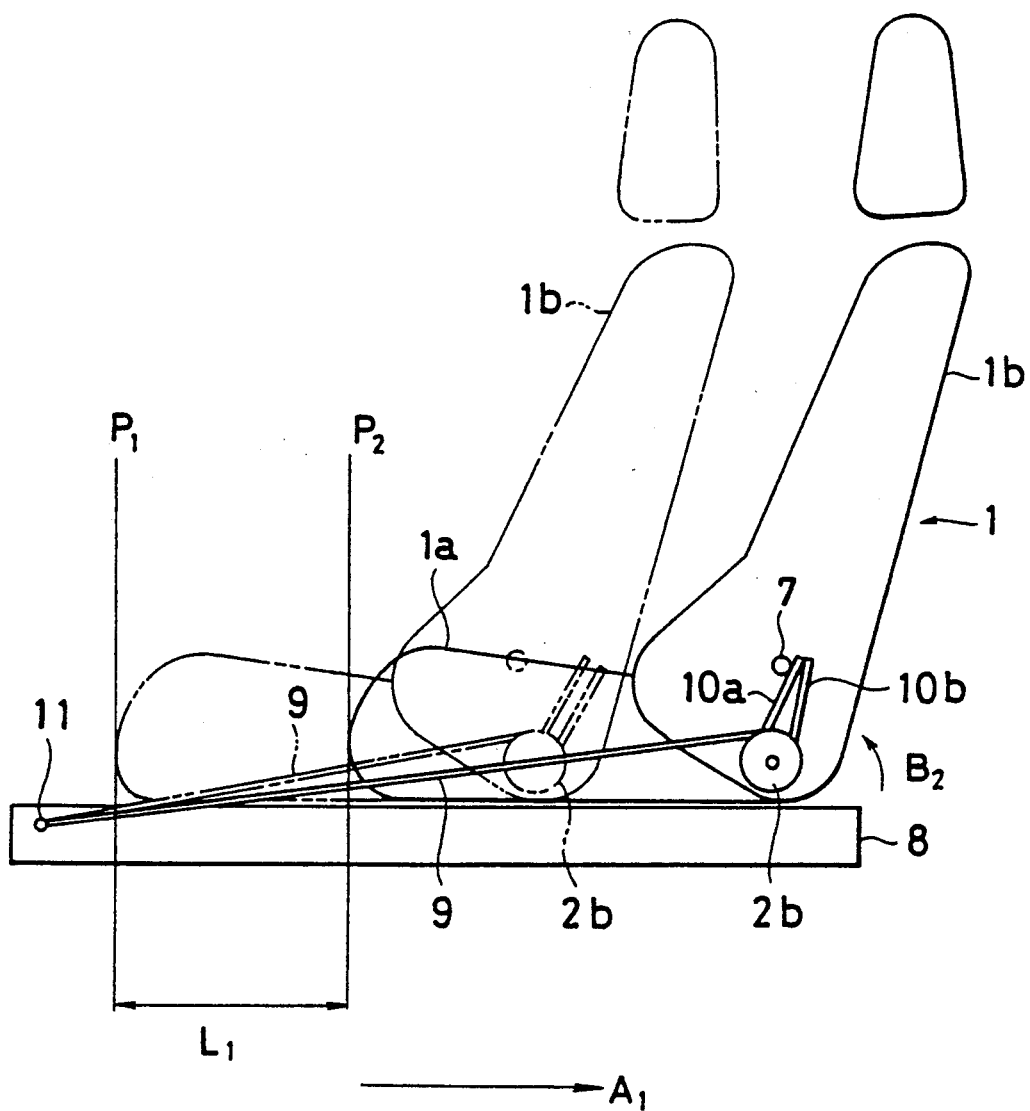
FIG. 3 is a side view showing the manner in which the seat is slidably adjusted.

As shown in FIG. 3, when the seat 1 is moved on the rails 8 in the direction of the arrow $A_1$, the rotary member 2b is rotated through a predetermined angle in the direction of the arrow $B_2$ by means of the wire 9 in response to the distance by which the seat 1 is slidably moved and with the reduction ratio 1/n.

If a distance $L_1$ by which the seat is slidably moved is such that the seat belt 15 is positioned beyond its effective restraint limit, or if the seat 1 is moved to a position $P_2$, the projecting pin 7 extending from one side of the backrest 1b is brought into contact with the resilient member 10a extending from the rotary member 2b as in the case previously mentioned. As a result, the resilient members 10a and 10b are brought into contact with one another. The relay 6 is then energized so that the contact 6a is enabled to turn on the lamp 3.

This will let the occupant known that the seat belt 15 is positioned beyond its effective restraint limit. So that, the occupant can move the seat 1 immediately from the position $P_2$ to the left in FIG. 3 so as to place the seat belt 15 within its effective restraint limit.

Next, reference is made to the manner in which the seat 1 is slidably adjusted, and the backrest 1b is tiltably adjusted.

Figure 4A:
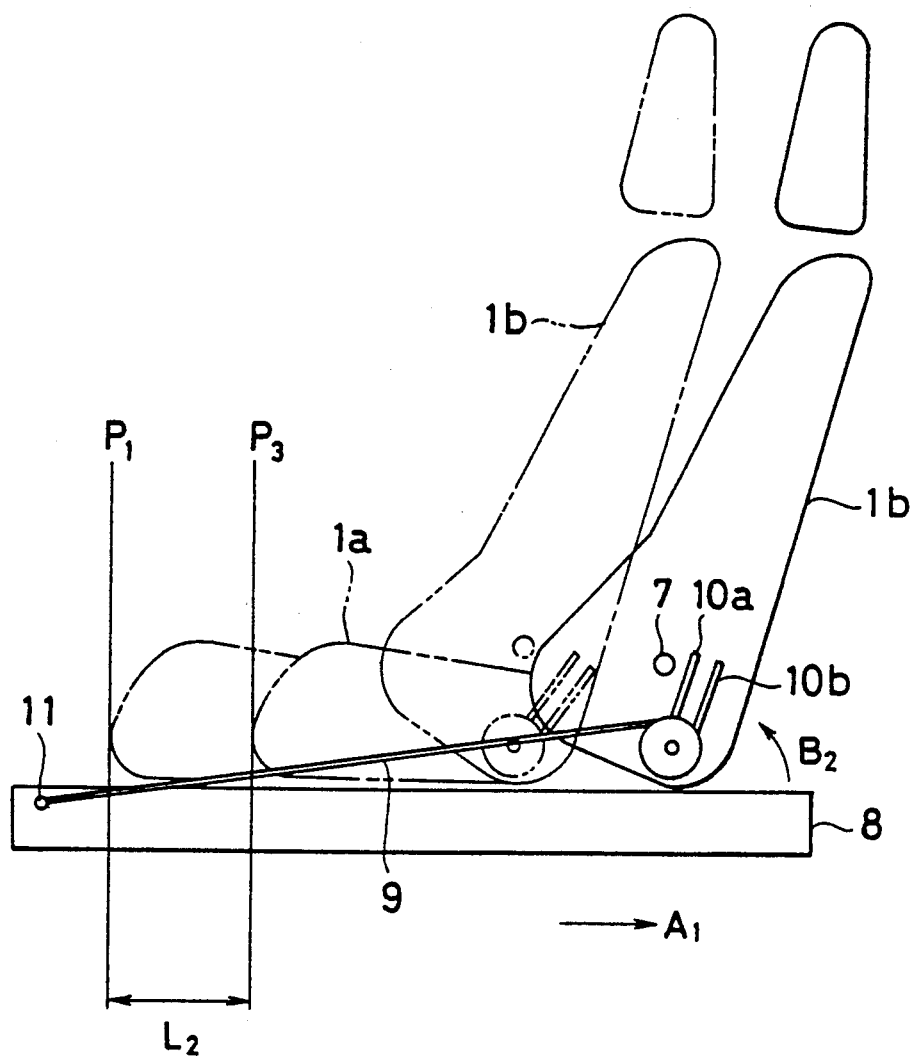
FIG. 4A is a side view showing the manner in which the seat is slidably adjusted.

As shown in FIG. 4A, the seat 1 is moved by a distance $L_2$, shorter than the distance $L_1$, whereby the seat 1 is moved from the position $P_1$ (forward position of the seat 1) to a position $P_3$.

At this time, the rotary member 2b is rotated in the direction of the arrow $B_2$ as in the case previously mentioned. Of the two resilient members 10a and 10b, the member 10a is moved closer to the projecting pin 7, but the the resilient members 10a and 10b are not brought into contact with one another.

Under the circumstances, the lamp is off, and the seat belt 15 is placed within its effective restraint limit.

Figure 4B:
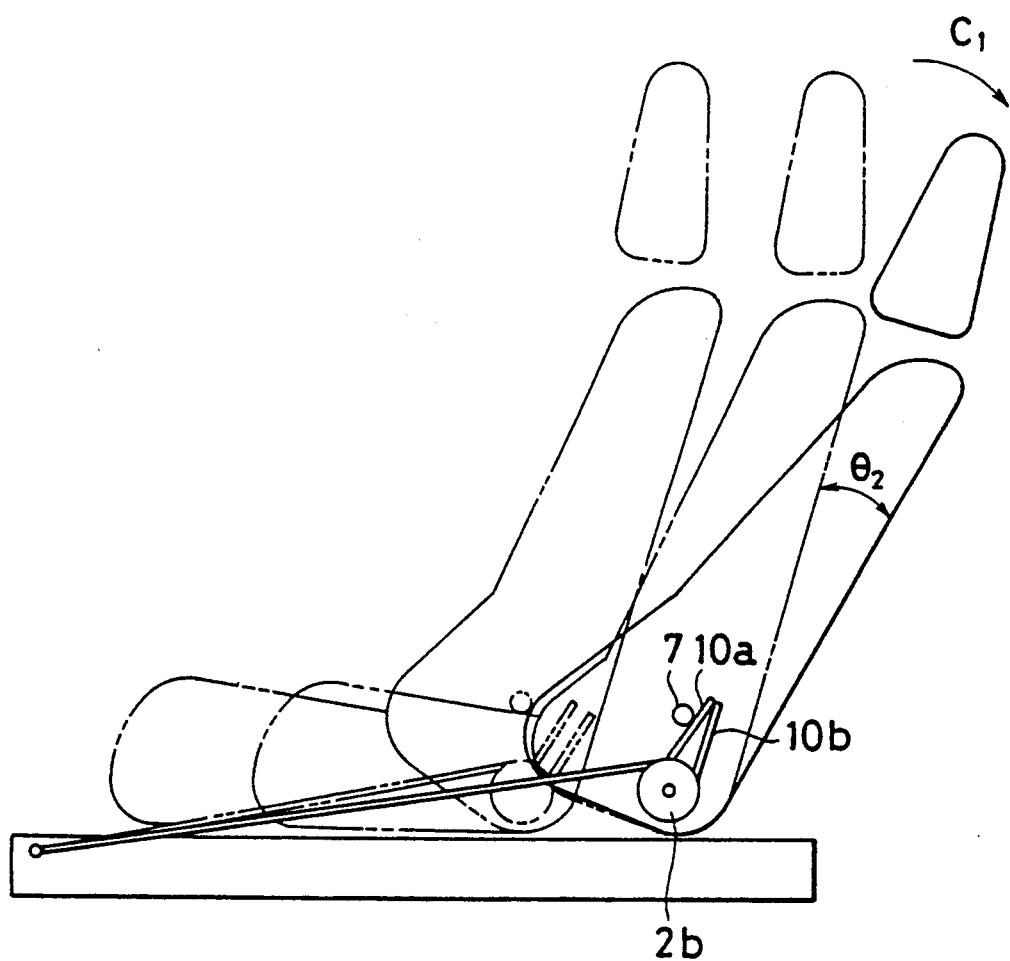
FIG. 4B is a side view showing the manner in which the backrest is tilted further from the position shown in FIG. 4A.
Figure 5A:
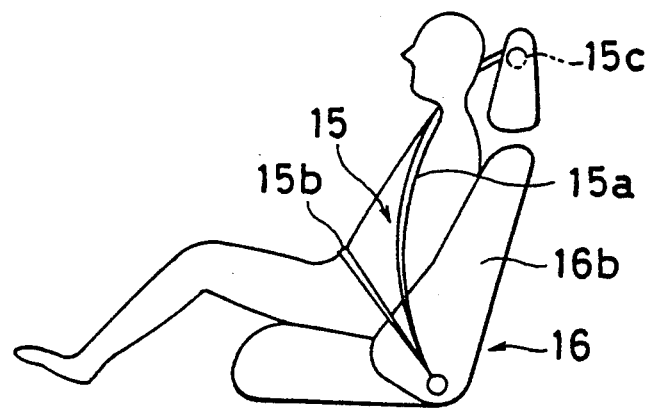
FIGS. 5A, 5B and 5C are views showing the manner in which the seat is adjusted, and the seat belt is fastened.
Figure 5B:
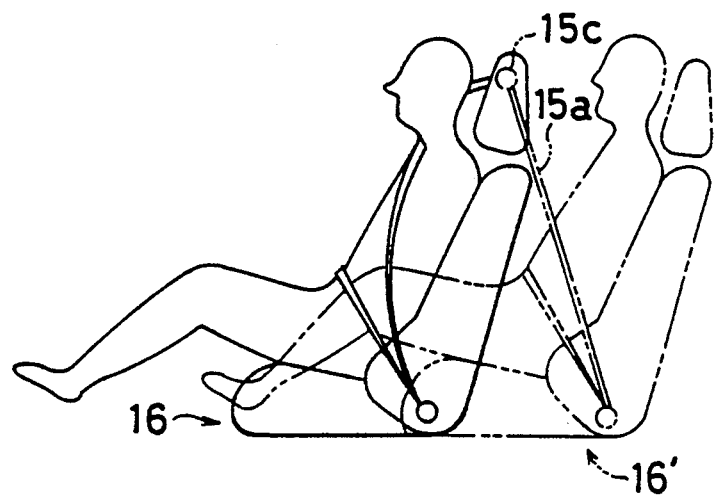
Figure 5C:
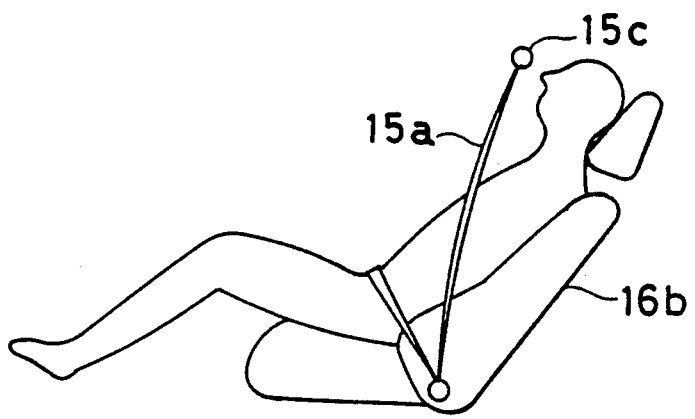

When the occupant then tilts the backrest 1b at an angle greater than an angle $\theta_2$ in the direction of the arrow $C_1$ as shown in FIG. 4B, the projecting pin 7 pushes the resilient member 10a so as to bring the resilient member 10a into contact with the resilient member 10b.

At this time, the angle $\theta_2$ is smaller than the angle $\theta_1$ shown in FIG. 2B in that the resilient member 10a is placed adjacent to the projecting pin 7.

The switch 10 is then turned on whereby the relay 6 is operated to close the contact 6a. This turns on the lamp 3.

This will let the occupant known that the backrest 1b is tilted at such angle $\theta_2$ that the seat belt 15 is positioned beyond its effective restraint limit. So that, the occupant can tilt back the backrest 1b immediately to place the seat belt 15 within its effective restraint limit.

As such, when the distance L by which the seat is moved in the direction of the arrow $A_1$ from the initial position P is small, then the angle $\theta$ at which the backrest is tilted can be changed greater. The greater the distance L, the smaller the allowable reclining angle $\theta$.

When the seat 1 is driven by a power unit, the sensor device may cooperate with the seat drive unit to permit automatic adjustment of the seat within the effective restraint limit of the seat belt.

According to the present invention as mentioned above, the occupant can be constantly notified of the effective restraint limit of the seat during adjustment of the seat. Thus, the present invention is capable of providing a system for warning an effective restraint limit of the seat belt that places the occupant in a safe condition.

What is claimed is:

1. A system for warning an effective restraint limit of a seat belt, comprising a seat slidably adjustable on a support in a to-and-fro direction a backrest that is and tiltably adjustable, a seat belt lap and shoulder assembly for restraining an occupant seated on said seat, sensor means for detecting an effective restraint limit of said seat belt, and notice means for notifying the occupant of a result as detected by said sensor means, wherein that the effective restraint limit of said seat belt assembly as detected by said sensor means is an angle of said backrest corresponding to a position of said seat as slidably adjusted.

2. A system for warning an effective restraint limit of a seat belt, comprising:
   support rails disposed in a vehicle,
   a seat slidable on said support rails and including a seat cushion and a backrest tiltably connected to said seat cushion;
   a rotary member body rotatable coaxially and independently of said backrest;
   a reel portion connected to said rotary member body through a reduction mechanism and disposed coaxially of said backrest;
   a wire having one end wound around said reel portion and the other end fixed to said rail, said reel portion being rotated by said wire when said seat is slidably moved on said rails;
   two resilient members extending from said rotary member body and made of an electrically conductive material;
   pin means extending from said seat cushion and positioned in such a manner that said two resilient members are brought into contact with one another when said seat reaches an effective restraint limit of a seat belt; and
   means for applying a voltage to said two resilient members to cause a current to flow through said two resilient members when bought into contact with one another and providing a warning.

3. The system of claim 2, wherein said warning is given by light means or by sound means.

4. The system of claim 2, wherein said seat belt includes a tongue, and said seat includes a buckle, and wherein said means for applying a voltage is to apply said voltage to said two activated resilient members when said tongue is inserted into said buckle.

* * * * *